(12) United States Patent
Kratschmer et al.

(10) Patent No.: US 7,962,890 B2
(45) Date of Patent: Jun. 14, 2011

(54) METHOD TO ASSESS THE SKILL LEVEL OF SOFTWARE DEVELOPMENT

(75) Inventors: Theresa C. Kratschmer, Yorktown Heights, NY (US); Peter Kenneth Malkin, Ardlsey, NY (US); Kavitha Srinavas, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 1337 days.

(21) Appl. No.: 11/504,863

(22) Filed: Aug. 16, 2006

(65) Prior Publication Data
US 2008/0046860 A1 Feb. 21, 2008

(51) Int. Cl.
G06F 9/44 (2006.01)
G06F 11/34 (2006.01)
G06F 3/00 (2006.01)
(52) U.S. Cl. ........... 717/102; 717/105; 705/11; 715/707
(58) Field of Classification Search .................. None
See application file for complete search history.

(56) References Cited

U.S. PATENT DOCUMENTS

| 7,210,119 B2* | 4/2007 | Pothos et al. | 717/102 |
| 2002/0160347 A1* | 10/2002 | Wallace et al. | 434/322 |
| 2003/0182178 A1* | 9/2003 | D'Elena et al. | 705/11 |
| 2005/0160395 A1* | 7/2005 | Hughes | 717/102 |

OTHER PUBLICATIONS

"Experimental evaluation of user errors at the skill-based level in an automative environment", Althoff et al., Apr. 2002, pp. 782-783, <http://delivery.acm.org/10.1145/510000/506595/p782-althoff.pdf>.*

"Changing qualifications for entry-level application developers", E. Ferguson, Apr. 2005, pp. 107-111, <http://delivery.acm.org/10.1145/1050000/1047863/p1 06-ferguson.pdf>.*

Kathryn A. Bassin, Theresa Kratschmer, and P. Santhanam, "Evaluating Software Development Objectively," IEEE Software, Nov./Dec. 1998, pp. 66-74, USA.

RAM Chillarege, Inderpal S. Bhandar, Jarir K. Chaar, Michael J. Halliday, Diane S. Moebus, Bonnie K. Ray, Man-Yuen Wong, "Orthogonal Defect Classification—A Concept for In-Process Measurements," IEEE Transactions on Software Engineering, vol. 18, No. 11, Nov. 1992, USA.

M.E. Fagan, "Design and Code Inspections to Reduce Errors in Program Development," IBM Systems Journal, vol. 38, Nos. 2&3, 1999, pp. 258-287, USA.

* cited by examiner

*Primary Examiner* — Thuy Dao
(74) *Attorney, Agent, or Firm* — Michael J. Buchenhomer; Vazken Alexanian

(57) ABSTRACT

A computer-implemented system for providing a skill level assessment of a developer of a given object, based on defects found in the object, includes: a processor configured for: receiving the object; obtaining at least one requirement associated with the object; obtaining at least one requirement associated with the developer of the object; finding defects in the object, based on the at least one requirement; mapping the defects found to a listing of actions; creating the skill level assessment of the developer using the mapped defects; and presenting the assessment to a user of the method. The system also includes a network interface, storage, and memory. In addition, logic stored in memory includes an obtain objects handler; a requirements assessment handler; a code analysis handler; a skill level handler; a report handler; and a development skill assessment database. Further, the assessment may be presented as a platform for internet content selection label associated with at least one web document related to the developer.

18 Claims, 4 Drawing Sheets

METHOD TO ASSESS THE SKILL LEVEL OF SOFTWARE DEVELOPMENT

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of software development, and more particularly relates to the field of assessing a level of software development skill.

BACKGROUND OF THE INVENTION

The software industry increasing relies on methods for checking and refining software code. "Software Inspections are a disciplined engineering practice for detecting and correcting defects in software artifacts, and preventing their leakage into field operations. Software Inspections were introduced in the 1970s at IBM, which pioneered their early adoption and later evolution. Software Inspections provide value in improving software reliability, availability, and maintainability." [Fagan, M. "Design and Code Inspections to Reduce Errors in Program Development." *IBM Systems Journal* 15, 3 (1976): 182-211].

Many software inspection tools for identifying software defects are currently in use. Two of these tools are PC-Lint, used for uncovering defects contained in C and C++ code, and JiveLint, used for inspecting Java™ code. PC-lint checks C/C++ source code for bugs, glitches, inconsistencies, non-portable constructs, and redundant code. JiveLint looks for unused code and variables, switch blocks without a default case, if a class overrides Object.equals( ) but not Object.hashCode( ), if the code uses == to compare Strings instead of equals( ), etc. The purpose of "linting" your code is to uncover potential problems prior to integration or porting, or to reveal unusual constructs that may cause subtle, hard-to-find errors; however, linting does not provide any evaluation of the creator of the software. An organization may be very diligent in conducting pre-production code checking, such as linting the code, code review sessions, etc., but without an effective tool to assess the skill level (and weaknesses) of the developers of the code, the same coding errors will occur again and again.

Orthogonal Defect Classification (ODC) is another useful tool which provides a method of evaluating the production and associated testing processes related to a given software artifact. For details regarding ODC see "Orthogonal Defect Classification," Ram Chillerage, et. al., IEEE Transactions on Software Engineering, vol. 18 no. 11, November 1992 and "Evaluating Software Development Objectively," Kathryn A. Bassin, Theresa Kratschmer, P. Santhanam, IEEE Software November/December 1998. Although ODC can provide indications of how a given software artifact is deficient and how the production and testing procedures should be modified, it does not provide a multidimensional assessment of the creator.

In fact, no such multidimensional assessment is provided for software code developers (software engineers) based on their work, either per artifact, or on a compilation of their work. Certification (e.g., Novel System Administrator certification) has become common in the industry and many employers require some sort of certification prior to hiring a developer. Certification, however, is limited to providing an indication that an individual understands, or at a minimum has passed a test regarding, a given topic. It does not provide a comprehensive assessment of the given individual's strengths and weaknesses with regard to the topic.

Many types of professional athletes have multidimensional assessments based on their work: ice skaters are judged for their skill, level of difficulty, and creativity, an assessment provided for each given performance. Each score is frequently expressed as a number between 1 and 10, each value determined by the opinion of one or more judges (subjectively). Baseball players are judged based on their performance: e.g., times-at-bat, errors, hits, and runs-batted-in. These values are maintained both for individual games, set of games and cumulatively for a given player's entire career. The values are specified numerically, both using integers (e.g., 200 home runs) and decimals (e.g., 0.300, i.e., a hit 3 out of 10 times).

The software industry has grown in complexity and corporations spend a great deal on software development, yet there exists no comprehensive method of assessing the skill level of software developers. Therefore, there is a need for a system and method that overcomes the aforementioned shortcomings.

SUMMARY OF THE INVENTION

Briefly, a preferred embodiment of the present invention provides a method of providing a multidimensional skill level assessment of the creator of a given object based on the object's defects. One application of the current invention is the assessment of a given programmer based on the defects found in a piece of software created by the programmer. The method includes steps of: receiving the object to be analyzed; obtaining requirements associated with the object; obtaining at least one requirement associated with the developer of the object; finding defects in the object, based on the requirements; mapping the defects found in the object to a listing of actions where the objects were introduced; creating the skill level assessment of the developer using the mapped defects; and presenting the skill level assessment to a user of the method. Further, the assessment may be presented as a platform for internet content selection label associated with at least one web document related to the developer of the object.

A computer-implemented system using the above method for providing a skill level assessment of a developer of a given object would include a processor configured for executing the above method steps. The system would also include a network interface, storage, and memory. In addition, logic stored in memory includes an obtain objects handler; a requirements assessment handler; a code analysis handler; a skill level handler; a report handler; and a development skill assessment database. In an alternative embodiment, a computer readable storage medium can include the logic for executing the above method steps.

BRIEF DESCRIPTION OF THE DRAWINGS

To describe the foregoing and other exemplary purposes, aspects, and advantages, we use the following detailed description of an exemplary embodiment of the invention with reference to the drawings, in which.

DETAILED DESCRIPTION

Figure 1:
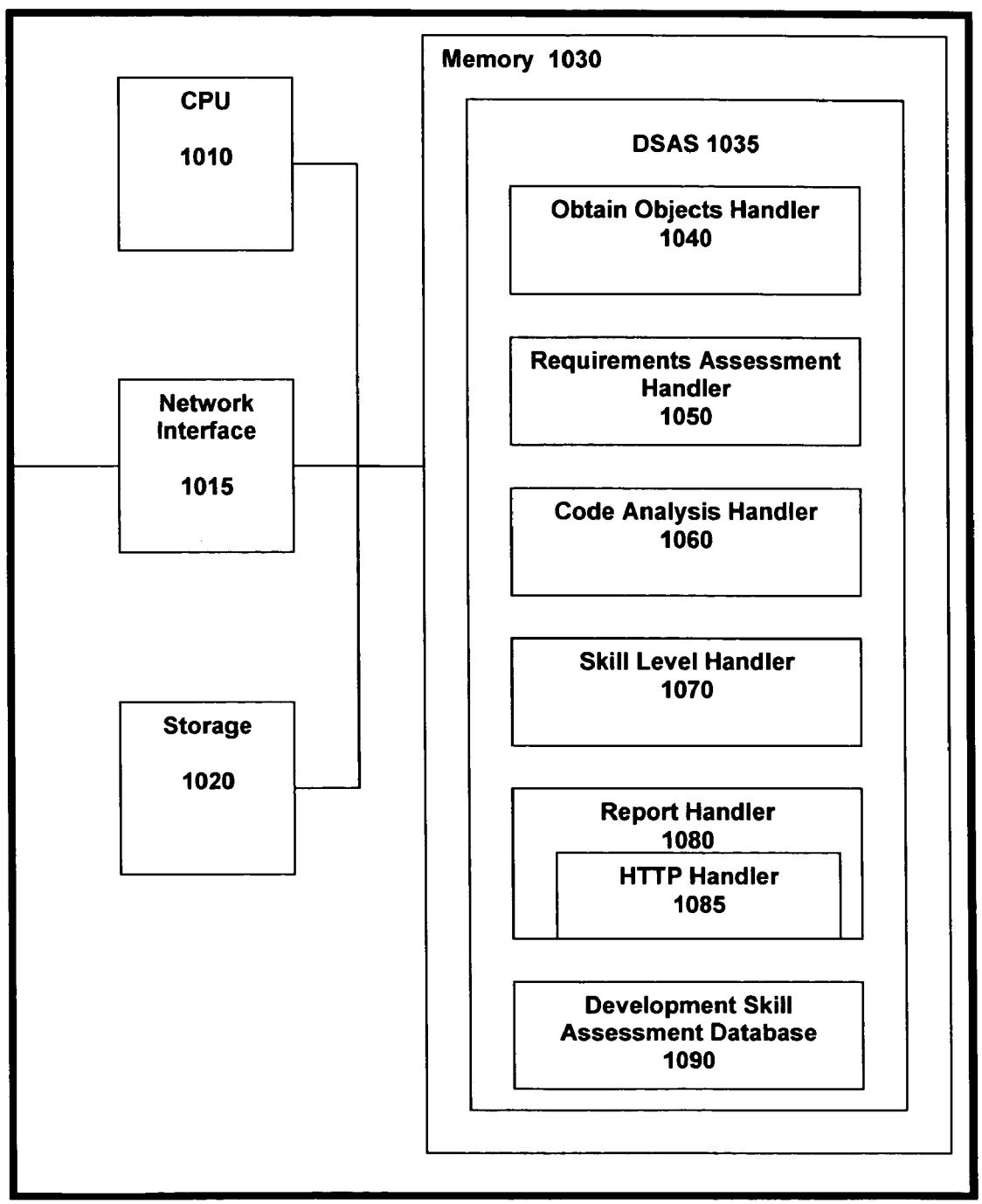
FIG. 1 is a simplified block diagram of a computer architecture for an embodiment of the invention.

We describe a method of assigning a level of skill to a software developer by examining an artifact written by that developer. That skill level is based on analysis of the source or object code. FIG. 1 illustrates the preferred embodiment for a development skills assessment (DSA) system 1000 according to an embodiment of the invention. A person or persons would use this system 1000 to provide a rating of the proficiency of one or more software developers. This rating provides the user with information on which many decisions can be made, such as: determining if further training is needed, and if so, in what areas; determining if a programmer is ready for a promotion; determining work assignments for programmers. The rating is based upon the defects found in the code, the number of defects found and the types of defects. The input into the system 1000 is the software code, and user requirements. The output of the system 1000 is a comprehensive assessment of the skill level of one or more software developers. The output of the system can also be a comparison of skill levels between two software developers.

The computer system 1000 includes a CPU 1010; a storage device 1020 such as a disk or data access storage device (DASD), a network interface 1015 for enabling web-based reporting, and memory 1030, such as RAM. In the present embodiment, the development skills assessment system (DSAS) 1035 is embodied as computer executable code that is loaded into memory 1030 (for execution by the CPU 1010) from a local permanent optical device (CD-ROM), or from the storage device 1020 (e.g. disk or DASD). The DSAS 1035 enables an authorized end-user to interact with the DSA software loaded into the memory 1030 of the computer 1000. The DSA software includes the following logical constructs:

Obtain Objects Handler 1040—reads in the code which may include but is not limited to source or object code. This handler 1040 may include, but is not limited to, a source code compiler and object code linker similar to that provided by IBM's Rational Software Development Platform, or GCC from the Free Software Foundation (51 Franklin St, Fifth Floor, Boston, Mass. 02110, USA).

Requirements Assessment Handler 1050—determines the user's requirements for assessing the code and assigning a skill level. These requirements include but are not limited to 1) the type of assessment to be performed and 2) the code developer's characteristics to be assessed. The type of assessment could include the following: 1) assessing the skill level of a single artifact of source code, 2) comparing two or more different artifacts of code from the same developer, or 3) comparing code from different developers. The requirements for the developer's characteristics include but are not limited to: 1) determining where in the software development process defects were injected such as requirements, high level design, low level design, or basic coding; 2) the developer's skill in usability, maintainability, efficiency, or performance, etc.; and 3) the use of advanced programming techniques, like those provided by design patterns (for details and examples refer to Gamma, Erich; Richard Helm, Ralph Johnson, and John Vlissides, *Design Patterns: Elements of Reusable Object-Oriented Software*, Addison-Wesley, 1995. ISBN 0201633612 and Vlissides, John M. *Pattern Hatching: Design Patterns Applied*. Addison-Wesley, ISBN 0-201-43293-5). In addition, the requirements assessment handler 1050 allows the user of the system 1000 to give priorities to the skills assessed so that a skill level can be assigned to each of the characteristics being evaluated.

Code Analysis Handler 1060—Once the requirements for assessment have been determined, the Code Analysis Handler 1060 analyzes the code, targeting the areas specified in the requirements.

Skill Assessment Handler 1070—determines the skill level for the code artifacts based on the requirements as determined by the Requirements Assessment Handler 1050.

Report Handler 1080—creates a report which includes the skill level for the type of assessment and the creator characteristics. This report may be web-based; therefore the Report Handler 1080 may optionally include a hypertext markup language (HTTP) Handler 1085.

Development Skills Assessment Database 1090—allows the software to store, modify, and delete data related to defect analysis, skill assessment, development characteristics, etc. A detailed description of the information maintained by the DSA Database 1090 is given below. The DSA Database 1090 can be implemented using database tools such as the DB/2 product sold by IBM, and like database platforms.

Figure 2:
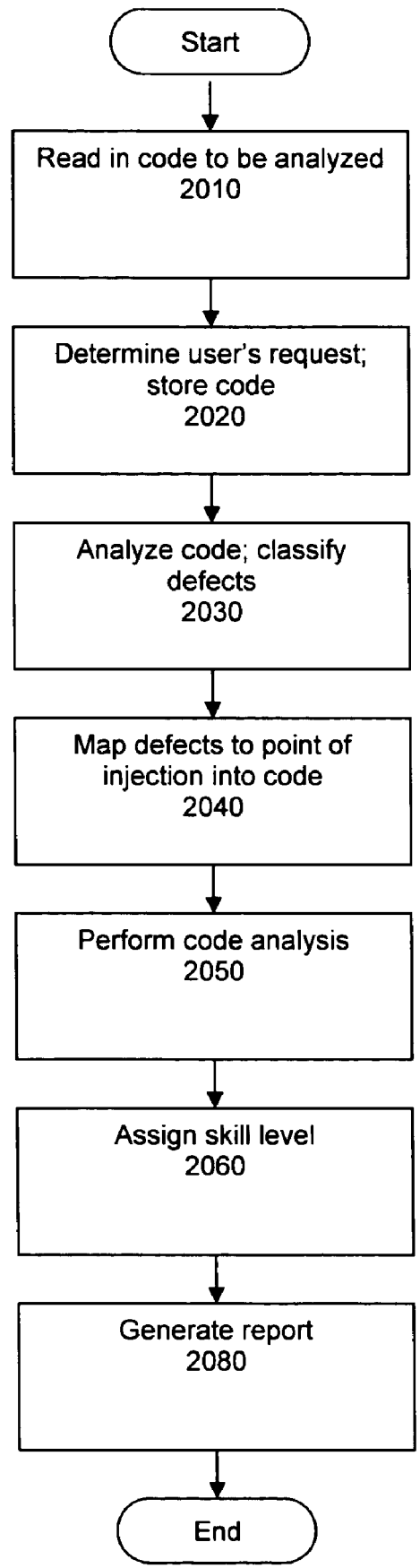
FIG. 2 is a flowchart according to one embodiment of the invention.

Referring to FIG. 2 there is shown a flow chart 2000 describing the logic performed by the DSAS 1035, according to a preferred embodiment of the present invention. The method begins in step 2010 when the Obtain Objects Handler 1040 reads in the code to be analyzed. The code can be in source code format or in object code format. The code may be in the form of a software application, a part of a software application, two or more parts of applications (the same application or different ones), or two ore more applications.

Next in step 2020 the Requirements Assessment Handler 1050 must determine the user's requirements in assessing and assigning skill to the code. If a single code artifact is to be assigned a skill level, the Obtain Objects Handler 1040 will store the code in the DSA Database 1090 as one file. If, however, the code consists of two or more blocks of code to be compared, then each block will be stored as a separate file. The blocks of code may be different sections of the same computer software application, code from two different applications written by the same developer, or perhaps code from two different developers for comparison purposes. For example, the skill level of two programmers can be compared by giving them the same programming task and then comparing the assessment of their resulting work.

Next in step 2030 the Code Analysis Handler 1060 will assess the given code in a variety of ways depending on the specifications from the user obtained by the Requirements Assessment Handler 1050. To determine where defects have been injected, the DSAS 1035 analyzes the code and classifies the defects using the Orthogonal Defect Classification (ODC) approach. The defect types and qualifiers are listed here:

Definitions of Defect Types and Qualifiers.

A defect type refers to the actual correction that needs to be made to the found defect. Possible defect types are:

a) Requirements/Design/Code defects—this covers changes to the requirements, design or product code only (where not natural language support (NLS) related);

b) Assignment/Initialization defects—these are values assigned incorrectly or not at all;

c) Checking defects—these are errors caused by missing or incorrect validation of parameters of data in conditional statements;

d) Algorithm/Method defects—these are problems with an algorithm or local data structure which can be resolved by rewriting an algorithm or local data structure, without the need to request a design change;

e) Function/Class/Object defects—these are more serious than algorithm/method defects; therefore they may require a formal design change, as they could significantly affect capability, interfaces or global data structure(s);

f) Timing/Serialization defects—this means that necessary serialization of a shared resource was either missing, incorrect or using the wrong technique;

g) Interface/Object-to-Object Messages defects—these are communication problems between modules, components, device drivers, objects or functions;

h) Relationship defects—these are problems related to associations among procedures, data structures and objects; they may involve a conditional association.

Qualifiers serve to further describe a defect. In keeping with the ODC approach, two qualifiers are used: a) missing—the defect type was due to an omission; and b) incorrect—the defect type was due to something that was in place, but was incorrect.

Figure 3:
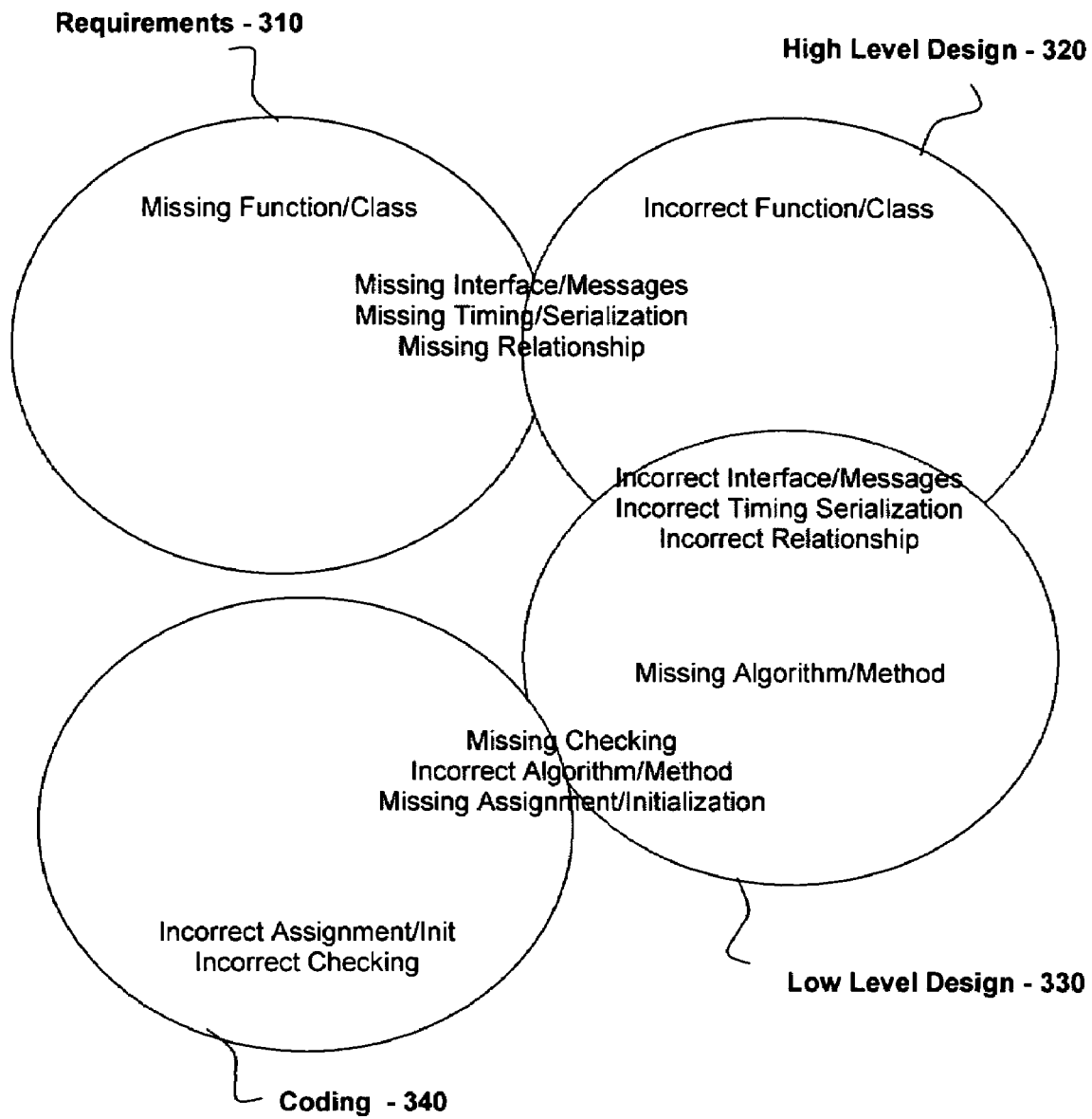
FIG. 3 is an illustration of the mapping of defect types to the activity responsible for introducing the defects.

In Step 2040, the defects uncovered will be mapped to their point of injection into the code, using the two qualifiers, missing and incorrect. This mapping is shown in Table 1. Table 1 lists the ODC defect types and qualifiers mapped to the activity where the defects were introduced. FIG. 3 provides a graphical illustration of the information in Table 1. The activities are compiled into four groups: Requirements 310, High Level Design 320, Low Level Design 330, and Coding 340. Requirements 310 is the highest-level activity (most general in scope) and Coding 340 is the lowest-level activity. Each activity is depicted by a circle and each circle contains the defects for the activity. Note that defects that are common to two activities are shown in grey overlapping the two circles. Beginning with Requirements 310, the defects to target in this high-level activity have to do with the basic requirements for the code, such as missing function/class; missing interface/messages; missing timing/serialization; and missing relationship.

The next level of activity to assess, High Level Design 320, includes some of the same elements of Requirements, in addition to incorrect function/class; incorrect interface/messages; incorrect timing/serialization; and incorrect relationship. Low Level Design 330 activities could produce some of the same defects as in High Level Design 320, with the additions of: missing algorithm/method; missing checking; incorrect algorithm/method; missing assignment/initialization. The lowest level activity, Coding 340, may generate some of the same errors found in Low Level Design 330, with the additions of: incorrect assignment/initialization; and incorrect checking.

TABLE 1

ODC Defect Types Mapped to Functions.

| Activity | Defect Types and Qualifiers |
| --- | --- |
| Requirements | Missing Function/Class; Missing Interface/Messages; Missing Timing/Serialization; Missing Relationship |
| High Level Design | Missing Interface/Messages; Missing Timing/Serialization; Missing Relationship; Incorrect Function/Class; Incorrect Interface/Messages; Incorrect Timing/Serialization; Incorrect Relationship |
| Low Level Design | Incorrect Interface/Messages; Incorrect Timing/Serialization; Incorrect Relationship; Missing Algorithm/Method; Missing Checking; Incorrect Algorithm/Method; Missing Assignment/Initialization |
| Coding | Missing Checking; Incorrect Algorithm/Method; Missing Assignment/Initialization; Incorrect Assignment/Initialization; Incorrect Checking |

When all of the defects from one or more code artifacts have been stored, in step 2050 the code will be assessed to determine which software development activity was responsible for injecting most of these defects. This will highlight the activity where the programmer is most deficient and needs to improve. For example, if most of the defects are found in Coding 340, the programmer could be skillful in designing the software product, but sloppy in writing the code. Additional code analysis may also be performed that assesses certain characteristics such as usability, maintainability, performance. Such ODC-based evaluation is well known in the art.

Similarly, static analysis of the code may be used to evaluate characteristics of the code based on common coding errors that programmers make, such as those examples shown in (a), (b) and (c) below. Each class of coding errors can be classified along dimensions such as usability, maintainability, performance, etc. For instance, static analysis can be used to detect bugs that cause:

(a) Incorrectness in programs such as null pointer (using an invalid pointer), race conditions or deadlocks. A null pointer, for example, can be detected by static analysis when an object is used without first being allocated. A race condition is a timing problem that occurs when two or more processes are simultaneously accessing the same file. In certain programming models (e.g., J2EE), certain objects are guaranteed to be used by multiple threads. Any fields that are globally shared by threads are prone to race conditions. Therefore, static analysis can be used to review the code to determine if both "load" and "store" operations occur to any fields that can be accessed by multiple threads. If that is the case, then the code has the potential for race conditions. A deadlock is when two or more competing tasks are each waiting for another to release a resource. As in the prior example, static analysis can be used to determine if there are multiple paths in the code that can lead to deadlock because different threads are waiting for each other's locks to be released.

(b) Performance degradation can occur when system resources such as file handles or database connections do not get released immediately after use. Static analysis can be used to find cases where an object is created and not "closed".

(c) Maintainability problems can occur when exceptions are not handled correctly. For instance, static analysis can be used to find exceptions that are simply never used for logging purposes, etc. These types of coding errors make software difficult to maintain and debug.

Once the code has been analyzed, in step 2060 the Skill Level Handler 1070 will assign a level for each of the areas or skills evaluated. The levels may include but are not limited to novice, intermediate, and expert. These levels will be assigned based on the priorities obtained by the user in the Requirements Assessment Handler 1050. Once a skill level has been assigned the area or areas that need improvement are known. The final step is the reporting step 2080 where a report is generated and presented to the user. The report may be presented as a printed listing, a web document, or a GUI display. A user of the system 1000 can use this report to improve the quality of a developer's work.

This final report can also be encoded using the Platform for Internet Content Selection (PICS) standard (see PICS Label Distribution Label Syntax and Communication Protocols, Version 1.1, W3C Recommendation 31 Oct. 1996 for details, or go to http://www.w3.org/TR/REC-PICS-labels). This encoding method can also be used to create a multidimensional rating or description. PICS is a method originally intended for the rating of Internet content, like text and graphics. The idea is that one can request a given piece of data from the web and, in addition to receiving the requested piece of data, the requestor receives a multidimensional rating of the given piece of data (e.g., level of violence, required level of training, nudity, etc.). This rating can be posted as a label in the web-response's header. Given such a PICS label, a user's web browser can be equipped with a content filter that will block the display of data whose associated PICS label does not meet or exceed a user-specified multidimensional threshold, (e.g. min and or max values of r each of the expected PICS label ratings). This threshold is specified using a PICS filter.

Figure 4:
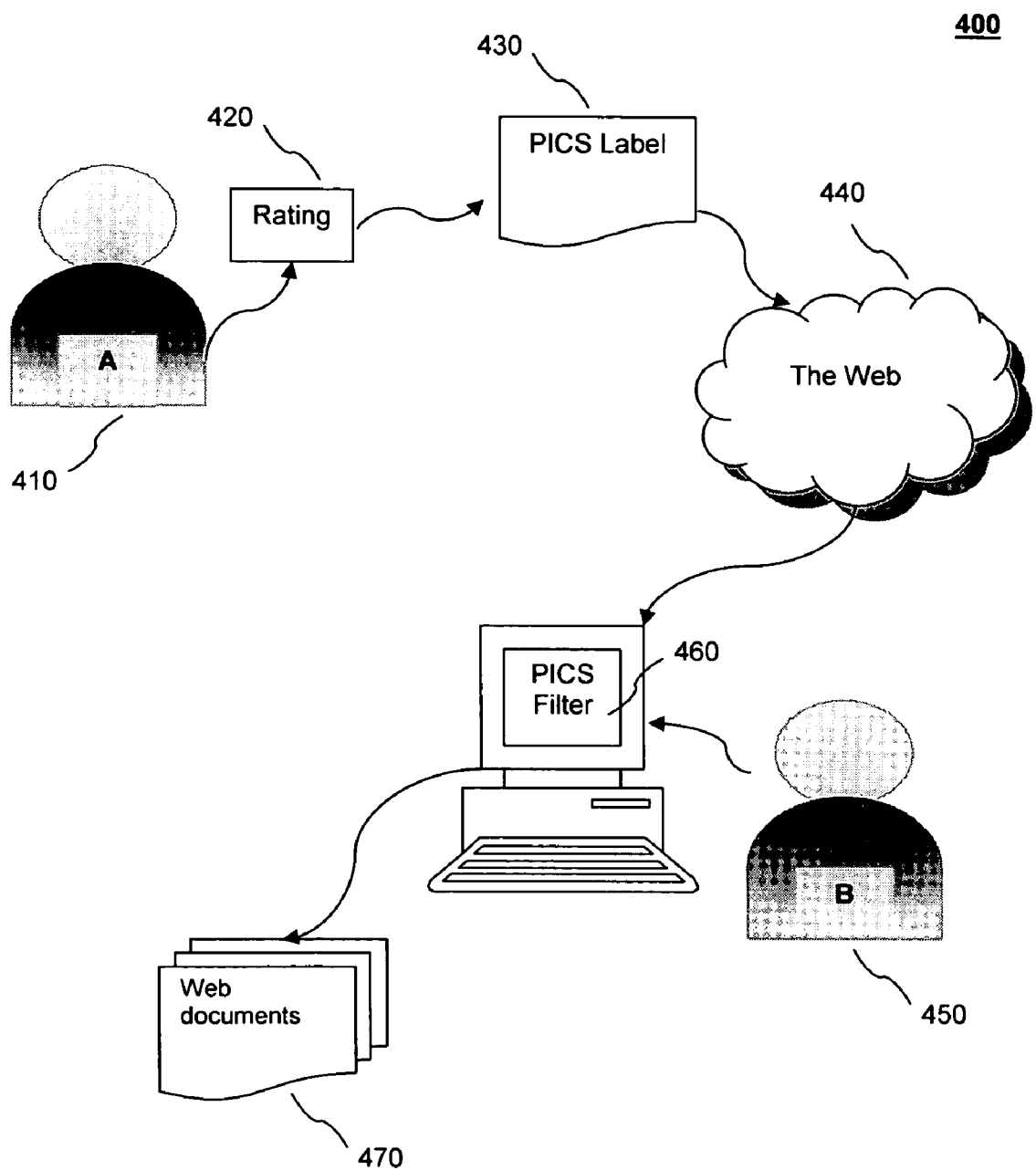
FIG. 4 is an illustration of the adaptation of the PICS method to an embodiment of the invention.

As will be appreciated by one with ordinary skill in the art, this same method can be applied to an embodiment of the present invention, as illustrated in FIG. 4. First, a user of the system, user A 410, applies a method according to the present invention to achieve a rating 420 of a given developer's skill assessment. This rating is then encoded as a PICS label 430, each of the strengths and weaknesses indicated by one of a label's ratings (e.g., expert Java programming ability and fundamental database programming ability). The PICS label is available on the Web 440 and references the given developer. When data about a given developer is requested, such a PICS-encoded assessment label could be returned with the requested data. Further, a given requestor could use the PICs filtering method to filter out any data which is not of interest. For example, using the example of job applicant screening, an employer, user B 450, would first determine the minimum assessment required for a given job and then encode this minimum assessment criterion in a PICS filter 460 (multidimensional threshold) located within his computer. Using the standard PICS filtering technique, the requestor's web-browser will block all data (e.g., developer's employment applications) that do not meet or exceed the specified minimum threshold. The web documents 470 that are made available to the user B 450 are those that meet or exceed the threshold.

In another embodiment of the present invention, interaction between a user and the system 1000 can be accomplished via a graphical user interface (GUI). The user is presented with display screens and after logging in and completing a verification process, the user may navigate through different display screens to enter the requirements for the analysis. The resulting output may be in the form of a screen or screens allowing a user to view different sections of the report and different levels of the report, for example, from a report showing a general assessed skill level value to a comprehensive listing of all defects found and their classifications, with suggestions for improvement. Reports may be viewed using a web-browser.

Therefore, while there has been described what is presently considered to be the preferred embodiment, it will understood by those skilled in the art that other modifications can be made within the spirit of the invention.

We claim:

1. A computer-implemented method executed by a computer processor device for providing a skill level assessment of a developer of a given software object, based on defects found in the software object, the method comprising:
   receiving source or object code of the software object and user requirements;
   analyzing the source or object code received;
   obtaining at least one requirement associated with the software object from the user requirements;
   obtaining at least one requirement associated with the developer of the software object from the user requirements;
   finding defects in the software object, based on the at least one requirement, wherein the defects are associated with a process;
   mapping the defects found to a listing of actions, wherein the listing of actions comprises areas of software development ranging from high-level development to low-level development, wherein the areas comprise: requirements, high-level design, low-level design, and coding;
   creating the skill level assessment of the developer using the mapped defects, comprising:
      creating a first skill level assessment for a first set of software objects;
      creating a second skill level assessment for a second set of software objects, wherein the first and second set of software objects are produced by a single developer and have a same set of requirements; and
      comparing the two assessments to provide a relative skill level assessment of the developer of the software objects;
   determining a minimal assessment of a given job;
   obtaining a developer's assessment;
   comparing the minimum assessment to the developer's assessment;
   determining whether the developer's assessment is sufficient;
   presenting the assessment to a user of the method as a web-based document; and
   providing a digital document for digitally signing a given assessment.

2. The computer-implemented method of claim 1 wherein the defects are associated with the software object.

3. The computer-implemented method of claim 1 further comprising steps of:
   creating a first skill level assessment for a first set of software objects;
   creating a second skill level assessment for a second set of software objects; and
   comparing the two assessments to provide a relative skill level assessment of the developer of the software objects.

4. The computer-implemented method of claim 3 wherein the first and second sets of software objects are created by a single developer.

5. The computer-implemented method of claim 3 wherein the first and second sets of software objects are created by distinct developers.

6. The computer-implemented method of claim 5 wherein the first and second sets of software objects have the same set of requirements.

7. The computer-implemented method of claim 1 further comprising steps of:
   determining a minimal assessment of a given job;
   obtaining a developer's assessment;
   comparing the minimum assessment to the developer's assessment; and
   determining whether the developer's assessment is sufficient.

8. The computer-implemented method of claim 1 wherein the developer is a group of individuals.

9. The computer-implemented method of claim 1 wherein the presenting step comprises displaying the assessment as a web-based document.

10. The computer-implemented method of claim 9 further comprising the step of providing a digital document for digitally signing a given assessment.

11. The computer-implemented method of claim 1 wherein the assessment is presented as a platform for internet content selection label, the method further comprising steps of:
   encoding the given assessment as a platform for internet content selection label; and
   associating the platform for internet content selection label with at least one web document related to the developer.

12. The computer-implemented method of claim 11 further comprising a step of:
   filtering the web documents based on assessment requirements, the step comprising:
   determining a minimum assessment criterion; encoding this minimum assessment criterion as a platform for an internet content selection filter; and
   providing this platform for internet content selection filter to a platform for internet content selection-filtering enabled content filter.

13. The computer-implemented method of claim 1 wherein the software object comprises two or more objects.

14. The computer-implemented method of claim 1 wherein the listing of actions comprises areas of software development ranging from high-level development to low-level development, wherein the areas comprise: requirements, high-level design, low-level design, and coding.

15. A non-transitory computer readable storage medium comprising logic for providing a skill level assessment of a developer of a given software object, based on defects found in the software object, the logic causing a computer device to perform steps of:
   receiving software object code of the software object;
   obtaining at least one user requirement associated with the software object;
   obtaining at least one requirement associated with the developer of the software object;
   finding defects in the software object, based on the at least one requirement, wherein the defects are associated with a process;
   mapping the defects found to a listing of actions, wherein the listing of actions comprises areas of software development ranging from high-level development to low-level development, wherein the areas comprise: requirements, high-level design, low-level design, and coding;
   creating the skill level assessment of the developer using the mapped defects, comprising:
   creating a first skill level assessment for a first set of software objects; and
   creating a second skill level assessment for a second set of software objects;
   wherein the first and second set of software objects are produced by a single developer and have a same set of requirements;
   comparing the two assessments to provide a relative skill level assessment of the developer of the software objects;
   determining a minimal assessment of a given job;
   obtaining a developer's assessment;
   comparing the minimum assessment to the developer's assessment;
   determining whether the developer's assessment is sufficient; and
   presenting the assessment to a user of the method as a web-based document.

16. A computer-implemented system for providing a skill level assessment of a developer of a given software object, based on defects found in the software object, the system comprising:
   a processor configured to perform steps of:
   receiving software object code of the software object;
   obtaining at least one requirement associated with the software object;
   obtaining at least one requirement associated with the developer of the software object;
   finding defects in the software object, based on the at least one requirement, wherein the defects are associated with a process;
   mapping the defects found to a listing of actions, wherein the listing of actions comprises areas of software development ranging from high-level development to low-level development, wherein the areas comprise: requirements, high-level design, low-level design, and coding;
   creating the skill level assessment of the developer using the mapped defects, comprising:
   creating a first skill level assessment for a first set of software objects; and
   creating a second skill level assessment for a second set of software objects;
   wherein the first and second set of software objects are produced by a single developer and have a same set of requirements;
   comparing the two assessments to provide a relative skill level assessment of the developer of the software objects;
   determining a minimal assessment of a given job;
   obtaining a developer's assessment;
   comparing the minimum assessment to the developer's assessment;
   determining whether the developer's assessment is sufficient; and
   presenting the assessment to a user of the method as a web-based document;
   wherein the computer-implement system further comprises:
   a network interface; and
   an information storage device.

17. The computer-implemented system of claim 16 further comprising logic stored in memory, the logic comprising:
   an obtain objects handler; a requirements assessment handler;
   a code analysis handler;
   a skill level handler;
   a report handler; and
   a development skill assessment database.

18. The computer-implemented system of claim 16 wherein the assessment is further presented as a platform for internet content selection label, wherein the platform for internet content selection label is associated with the web document related to the developer.

* * * * *